United States Patent
Polman et al.

(10) Patent No.: US 11,455,095 B2
(45) Date of Patent: Sep. 27, 2022

(54) METHOD AND A LIGHTING CONTROL DEVICE FOR CONTROLLING A PLURALITY OF LIGHTING DEVICES

(71) Applicant: SIGNIFY HOLDING B.V., Eindhoven (NL)

(72) Inventors: Robertus Johannes Polman, Nijmegen (NL); Gerrit Jacob Kooy, Eindhoven (NL); David Oldenburger, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/053,883

(22) PCT Filed: Apr. 24, 2019

(86) PCT No.: PCT/EP2019/060437
§ 371 (c)(1),
(2) Date: Nov. 9, 2020

(87) PCT Pub. No.: WO2019/214941
PCT Pub. Date: Nov. 14, 2019

(65) Prior Publication Data
US 2021/0232301 A1 Jul. 29, 2021

(30) Foreign Application Priority Data
May 8, 2018 (EP) .................... 18171256

(51) Int. Cl.
*G06F 3/048* (2013.01)
*G06F 3/04883* (2022.01)
(Continued)

(52) U.S. Cl.
CPC ........ *G06F 3/04883* (2013.01); *G06F 3/0486* (2013.01); *G06F 3/04845* (2013.01);
(Continued)

(58) Field of Classification Search
None
See application file for complete search history.

(56) References Cited

U.S. PATENT DOCUMENTS 10,645,357 B2 * 5/2020 Zhu .......................... H04N 9/76
10,721,807 B2 * 7/2020 Aggarwal .............. H05B 45/10
(Continued)

FOREIGN PATENT DOCUMENTS

WO 2007052195 A1 5/2007

*Primary Examiner* — Hua Lu

(57) ABSTRACT

A method of controlling a plurality of lighting devices (120, 122) is disclosed. The method comprises: grouping the plurality of lighting devices (120, 122) into a group of lighting devices (120, 122), rendering a virtual representation of the group of lighting devices (120, 122) at a first location in an image on a display (102), determining a first color associated with one or more pixels at the first location in the image, obtaining light rendering information from the plurality of lighting devices (120, 122), wherein the light rendering information relates to light rendering capabilities of the respective lighting devices (120, 122), receiving a user input indicative of a repositioning of the virtual representation from the first location to a second location in the image, determining, based on the light rendering information, if the lighting devices (120, 122) of the group are able to render a second color associated with one or more pixels at the second location in the image, dividing the group of lighting devices (120, 122) into a first subgroup comprising at least one lighting device that is unable to render the second color and a second subgroup comprising at least one lighting device that is able to render the second color, rendering a first virtual representation of the first subgroup, and a second virtual representation of the second subgroup in the image on the display (102), controlling the at least one lighting device of the first subgroup according to the first (Continued)

color, and controlling the at least one lighting device of the second subgroup according to the second color.

13 Claims, 5 Drawing Sheets

(51) Int. Cl.
    *H05B 45/20*     (2020.01)
    *G06F 3/04845*     (2022.01)
    *G06F 3/04847*     (2022.01)
    *G06F 3/0486*     (2013.01)
    *H05B 47/175*     (2020.01)
    *G06F 3/04842*     (2022.01)

(52) U.S. Cl.
    CPC ......... *G06F 3/04847* (2013.01); *H05B 45/20* (2020.01); *G06F 3/04842* (2013.01); *H05B 47/175* (2020.01)

(56) References Cited

U.S. PATENT DOCUMENTS

| | | | |
|---|---|---|---|
| 2004/0052076 A1* | 3/2004 | Mueller | F21V 23/0442 362/293 |
| 2005/0248299 A1* | 11/2005 | Chemel | H05B 47/155 315/312 |
| 2005/0275626 A1* | 12/2005 | Mueller | H05B 47/19 345/156 |
| 2009/0230894 A1* | 9/2009 | De Goederen | H05B 45/20 315/313 |
| 2011/0169413 A1* | 7/2011 | Wendt | H05B 47/165 315/152 |
| 2017/0011670 A1* | 1/2017 | van de Ven | H05B 45/46 |
| 2017/0186222 A1* | 6/2017 | Hata | G06T 15/506 |
| 2017/0208672 A1* | 7/2017 | Goergen | H05B 47/19 |
| 2018/0075626 A1* | 3/2018 | Magielse | H05B 45/20 |
| 2019/0004678 A1* | 1/2019 | Zhang | G06F 3/0482 |
| 2019/0098729 A1* | 3/2019 | Broers | H05B 47/155 |
| 2019/0114062 A1* | 4/2019 | Niemantsverdriet | G06F 3/04847 |
| 2019/0124745 A1* | 4/2019 | Mason | G06K 9/6219 |
| 2019/0124749 A1* | 4/2019 | Deixler | H05B 47/19 |
| 2019/0132928 A1* | 5/2019 | Rodinger | H05B 47/18 |

* cited by examiner

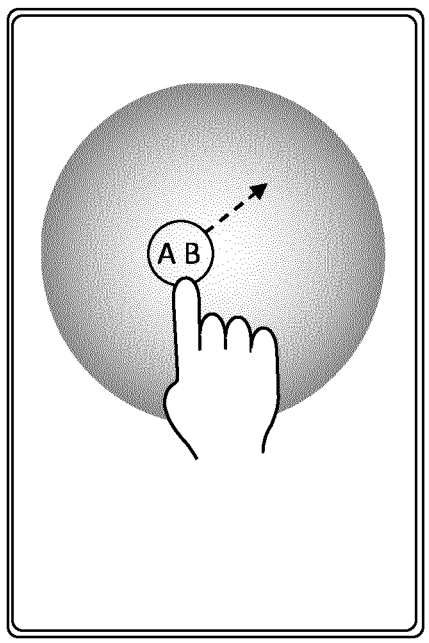 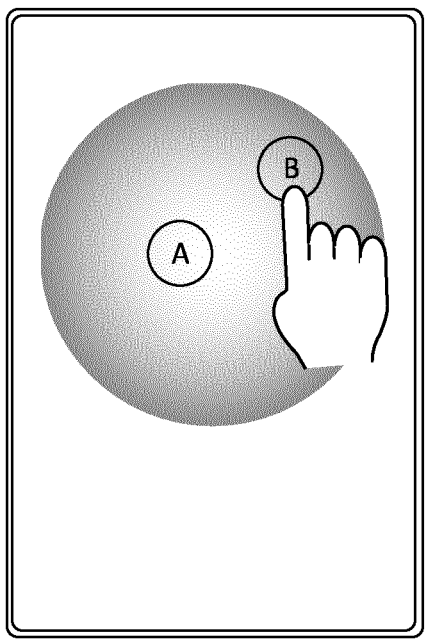
Fig. 2a　　　　　　　　Fig. 2b
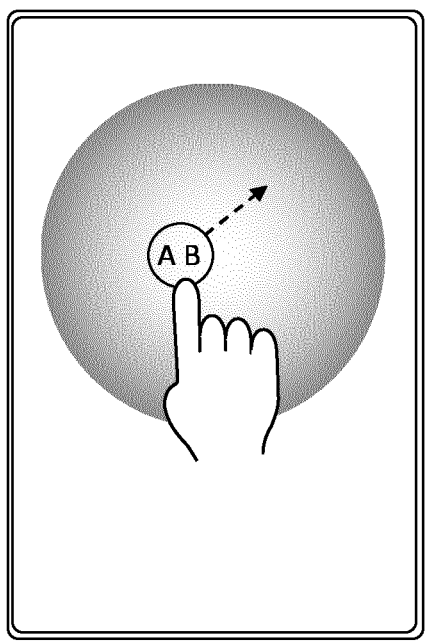 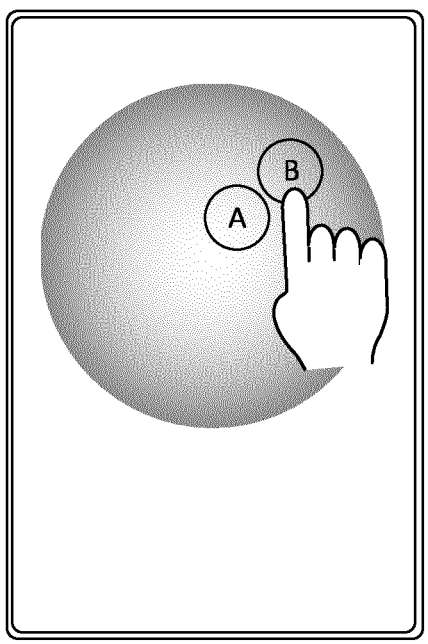
Fig. 3a　　　　　　　　Fig. 3b

METHOD AND A LIGHTING CONTROL DEVICE FOR CONTROLLING A PLURALITY OF LIGHTING DEVICES

CROSS-REFERENCE TO PRIOR APPLICATIONS

This application is the U.S. National Phase application under 35 U.S.C. § 371 of International Application No. PCT/EP2019/060437, filed on Apr. 24, 2019, which claims the benefit of European Patent Application No. 18171256.3, filed on May 8, 2018. These applications are hereby incorporated by reference herein.

FIELD OF THE INVENTION

The invention relates to a method of controlling a plurality of lighting devices and to a computer program product for executing the method. The invention further relates to a lighting control device and a system for controlling a plurality of lighting devices.

BACKGROUND

Home and office lighting control systems enable users to control lamps that are distributed throughout a space. A user can select a lighting device, for instance by selecting it on a user interface of a mobile device such as a mobile phone, and provide a user input to change the light output (e.g. intensity, color, direction, etc.) of the lighting device. The user interface may further enable users to group lighting devices, for instance by dragging an icon of a first lighting device to an icon of a second lighting via a touch screen of the mobile device. When such a group has been created, the user can control all lighting devices of the group simultaneously.

International application WO 2007/052195 A1 discloses a method for controlling color output of a variable color lighting system. The lighting devices may be controlled as a group or individually. A user interface may show the color emission capabilities (gamuts) of the lighting devices.

SUMMARY OF THE INVENTION

The inventors have realized that when a user groups different types of lighting devices with different capabilities, not all lighting devices of the group may be able to be controlled similarly. If, for example, a user would group a tunable white lighting device (i.e. a lighting device configured to emit white light, wherein the color temperature of the white light is adjustable) with a multi-color lighting device (e.g. a multi-colored LED lighting device with an adjustable color), the tunable white lighting device may not be able to render certain colors (e.g. green). This creates a problem, because when the user would select a green color for the created group, the tunable white lighting device is not able to render this green color. When a user has installed and grouped multiple (types of) lighting devices, it may be difficult for the user to remember which lighting devices have been assigned to which group. Thus, when the user would want to change the light output of the created group to green, the light output of the tunable white lighting device would not change to green, which may confuse the user. When the user interface indicates that the group is being controlled according to a green light setting, without communicating to the user that the tunable white lighting device is unable to change to green, there is a mismatch between what is shown on the user interface and the light output of the tunable white lighting device, which may be further confusing for the user.

It is therefore an object of the present invention to communicate to a user how different types of lighting devices are grouped and how they can be controlled. It is a further object of the present invention to provide a method and a lighting control device for grouping and controlling different types of lighting devices.

According to a first aspect of the present invention, the object is achieved by a method of controlling a plurality of lighting devices, the method comprising the steps of:
  grouping the plurality of lighting devices into a group of lighting devices,
  rendering a virtual representation of the group of lighting devices at a first location in an image on a display,
  determining a first color associated with one or more pixels at the first location in the image,
  obtaining light rendering information from the plurality of lighting devices, wherein the light rendering information relates to light rendering capabilities of the respective lighting devices,
  receiving a user input indicative of a repositioning of the virtual representation from the first location to a second location in the image,
  determining, based on the light rendering information, if the lighting devices of the group are able to render a second color associated with one or more pixels at the second location in the image,
  dividing the group of lighting devices into a first subgroup comprising at least one lighting device that is unable to render the second color and a second subgroup comprising at least one lighting device that is able to render the second color,
  rendering a first virtual representation of the first subgroup, and a second virtual representation of the second subgroup in the image on the display,
  controlling the at least one lighting device of the first subgroup according to the first color, and
  controlling the at least one lighting device of the second subgroup according to the second color.

The virtual representation (e.g. an icon) of the group of lighting devices is rendered as an overlay on an image on the display. The color of the pixels in the image associated with the first location, i.e. the location of the virtual representation, are determined, and the plurality of lighting devices may be controlled according to that color. This enables a user to move the virtual representation across the image rendered on the display to change the light output of the lighting devices of the group. If, however, one of the lighting devices of the group is not able to render the color as selected by a user, the group is split into one or more subgroups based on the light rendering information of the plurality of lighting devices of the group. For instance, when the user would want to change the light output of the created group to green, and one of the lighting devices of the group is not able to render that color, the group may be split into a first subgroup of lighting devices that cannot render that color and a second subgroup of lighting devices that can render that color. The first virtual representation may indicate which lighting devices are present in the first subgroup. The second virtual representation may indicate which lighting devices are present in the second subgroup. After the split, the light output of the first subgroup devices would not change to green, whereas the light output of the second subgroup would change to green. By also splitting the virtual representation into a first (sub) virtual representation and a second (sub) virtual representation, the user is informed about the ungrouping of the group. This is beneficial because it enables a user to see how different types of lighting devices are grouped and ungrouped, and how they are controlled.

The second virtual representation of the second subgroup may have the same appearance as the virtual representation of the group of lighting devices, and a new (first) virtual representation for the first subgroup may be created/rendered. Alternatively, the first virtual representation of the first subgroup may have the same appearance as the virtual representation of the group of lighting devices, and a new (second) virtual representation for the second subgroup may be created/rendered. In other words, the virtual representation of the group of lighting devices may be unchanged when the group of lighting devices is divided into the first subgroup and the second subgroup. The first virtual representation may be rendered at the first location, and the second virtual representation may be rendered at the second location. As a result, the first virtual representation of the first subgroup remains at the first location, and the second virtual representation of the second subgroup moves to the user-indicated second location.

The first virtual representation may be rendered at a third location, while the second virtual representation may be rendered at the second location. The third location may for example be a location in the image where the color values of the pixels in the image are close or closest to the color values of the pixels at the second location. In other words, the third location may be selected such that the color of the lighting device that is unable to render the color of the second location in the image resembles the color of the second location. This is beneficial, because the lighting device that is unable to render the color provides illumination that approaches the user-selected second color.

The method may further comprise:
receiving a second user input indicative of a regrouping of the first subgroup and the second subgroup,
rendering a regroup virtual representation in the image.

The user may, for example, drag the first virtual representation of the first subgroup to the second virtual representation of the second subgroup in order to regroup them. The regroup virtual representation may be rendered at a predefined location in the image, for instance in the center of the image, in a corner of the image, at a predefined color in the image, etc. Alternatively, the regroup virtual representation may be rendered at a current location of the first virtual representation in the image, i.e. at the location of the first virtual representation of the first subgroup. Alternatively, the regroup virtual representation may be rendered at a location at which one or more pixels of the image correspond to a current light setting of the first subgroup of lighting devices, e.g. at a location in the image which comprises color values that substantially correspond to the color values of the current light setting of the one or more lighting devices of the first subgroup.

The image may be an image of a color spectrum, such as a full color spectrum (e.g. a CIE color spectrum) or a warm-to-cool white color spectrum. Alternatively, the image may be an image from a user library or photo gallery, etc.

The image may be an image of a first color spectrum, and the at least one lighting device of the first subgroup may be configured to render a part of the colors of the first color spectrum. The method may further comprise:

obtaining a second image comprising a second color spectrum, wherein the at least one lighting device of the first subgroup is configured to render the colors of the second color spectrum,
receiving a third user input,
replacing the first image with the second image on the display upon receiving the third user input. This embodiment is beneficial because it enables a user to switch from the first color spectrum (from which the first subgroup may only render a limited number of colors) to a second color spectrum (from which the first subgroup may render (all or a part of) the colors).

The method may further comprise the step of rendering the first virtual representation in the second image at a location of which one or more pixels are associated with the first color. After replacement of the first image by the second image, the first virtual representation of the first subgroup may be rendered at a location in the image where the color values of the image correspond to the color values of the first color/current light setting of the lighting devices of the first subgroup.

The third user input may be indicative of a selection of the first virtual representation. Thus, the replacement of the first image by the second image may occur when the user selects the first virtual representation. Alternatively, an image selector may be provided (for instance on the display) which enables a user to switch between the first and the second image.

The user input may be a touch input on a touch-sensitive device of the display. Alternatively, the user input may be a point, select and drag input (e.g. with a pointing device such as a mouse device), a gaze direction, a motion gesture, a voice input, etc. The user may select a virtual representation and move it across the image rendered on the display.

The user input may comprise dragging the virtual representation across the image on the display, for instance by providing a touch input via the touch-sensitive device of the display. This is beneficial because it enables a user to simply select and drag a virtual representation across the display.

The group/plurality of lighting devices may comprise at least one tunable white lighting device, and at least one multi-color lighting device. The multi-color lighting device may for example be configured to render colors of the CIE color spectrum, including whites that can be rendered by tunable white lighting devices. Additionally or alternatively the group/plurality of lighting devices may comprise single-white-point lighting devices and/or color only lighting devices (i.e. lighting devices that are less capable of rendering different types of white light compared to multi-color lighting device that can also render shades of white similar to tunable white lighting devices).

The group/plurality of lighting devices may comprise at least one first lighting device with a first dimming/brightness range, and at least one second lighting device with a second dimming/brightness range. The color rendering capabilities of the first and second lighting devices may be the same. A user may use the image to change a brightness of such a group of lighting devices. The group may be ungrouped/split into the first and second subgroups when one of the lighting devices is unable to increase/decrease the brightness beyond a certain threshold, while the other lighting device is able to.

The method may further comprise, after the step of determining the first color associated with one or more pixels at the first location in the image, controlling the lighting devices of the group of lighting devices according to the first color.

According to a second aspect of the present invention, the object is achieved by a computer program product comprising computer program code to perform the method of any one of the preceding embodiments when the computer program product is run on a processing unit of the computing device.

According to a third aspect of the present invention, the object is achieved by a lighting control device for controlling a plurality of lighting devices, the lighting control device comprising:
 a display,
 a user interface configured to receive a user input,
 a communication unit configured to communicate with the plurality of lighting devices,
 a processor configured to:
 group the plurality of lighting devices into a group of lighting devices,
 render a virtual representation of the group of lighting devices at a first location in an image on the display,
 determine a first color associated with one or more pixels at the first location in the image,
 obtain light rendering information from the plurality of lighting devices, wherein the light rendering information relates to light rendering capabilities of the respective lighting devices,
 receive, via the user interface, a user input indicative of a repositioning of the virtual representation from the first location to a second location in the image,
 determine, based on the light rendering information, if the lighting devices of the group are able to render a second color associated with one or more pixels at the second location in the image,
 divide the group of lighting devices into a first subgroup comprising at least one lighting device that is unable to render the second color and a second subgroup comprising at least one lighting device that is able to render the second color,
 render a first virtual representation of the first subgroup, and a second virtual representation of the second subgroup in the image on the display,
 control, via the communication unit, the at least one lighting device of the first subgroup according to the first color, and
 control, via the communication unit, the at least one lighting device of the second subgroup according to the second color.

The processor may be further configured to, if no light rendering information has been received from the plurality of lighting devices, control the group of lighting devices according to the second color. The processor may be further configured to receive a signal from the lighting devices of the group. This signal may be indicative of that a certain lighting device is unable to render the second color. Subsequently, the processor may perform the step of dividing the group of lighting devices into the first subgroup comprising at least one lighting device that is unable to render the second color and the second subgroup comprising at least one lighting device that is able to render the second color. The processor may further render a first virtual representation of the first subgroup, and a second virtual representation of the second subgroup in the image on the display. This is beneficial in systems wherein the lighting devices cannot provide their light rendering information, or in systems wherein the light rendering information is incorrect.

According to a fourth aspect of the present invention, the object is achieved by a lighting system comprising:
 the lighting control device, and
 a plurality of lighting devices configured to receive control commands from the lighting control device.

It should be understood that the computer program product, the lighting control device and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which:

FIGS. 2a and 2b show schematically an embodiment of ungrouping two lighting devices in an image, wherein the image is a color spectrum, FIGS. 3a and 3b show schematically an embodiment of ungrouping two lighting devices in an image, wherein the image is a color spectrum.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
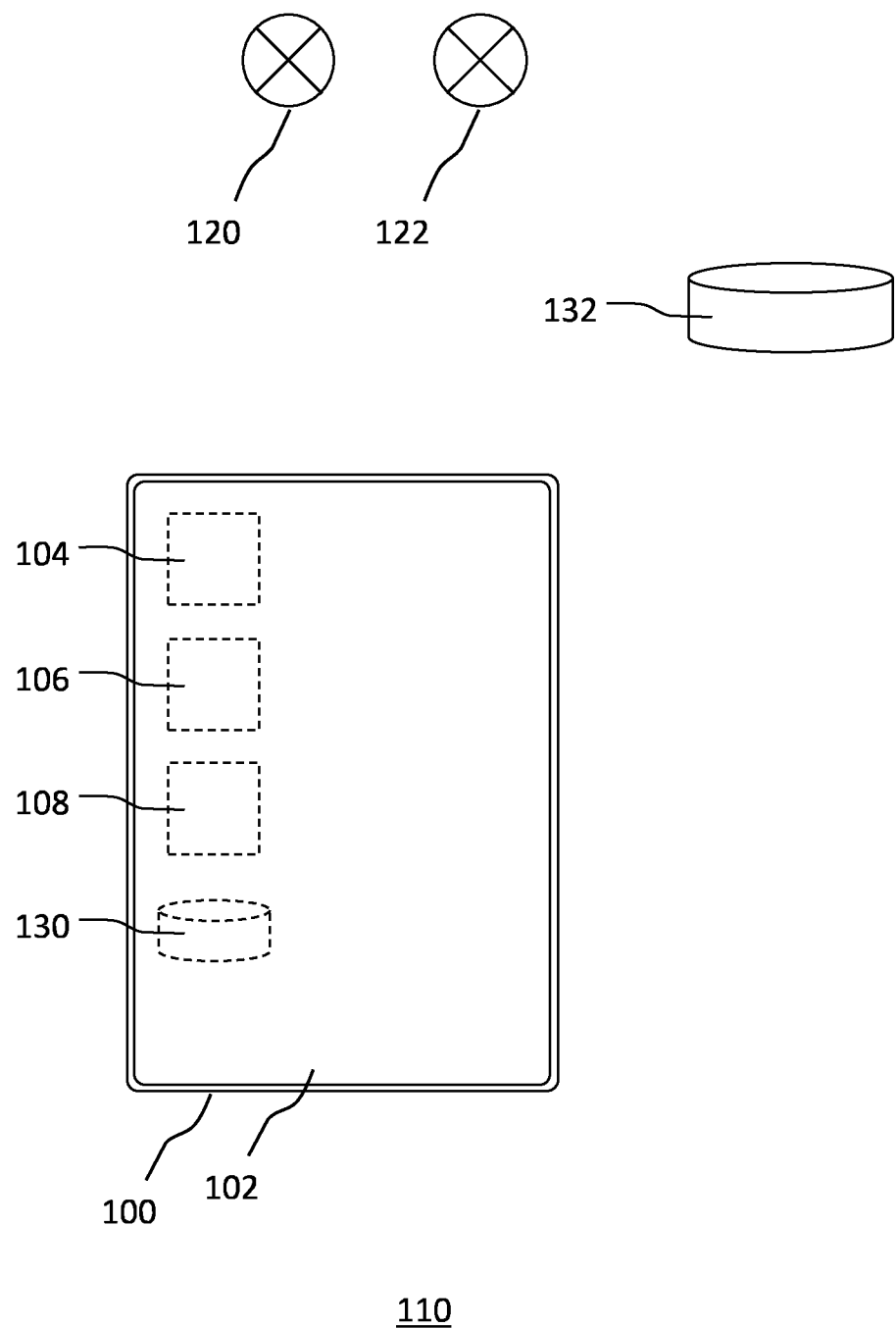
FIG. 1 shows schematically an embodiment of a lighting system comprising a control device for controlling a plurality of lighting devices.

FIG. 1 shows a lighting system 110 comprising a control device 100 (e.g. a smartphone, a tablet pc, a smart watch, a laptop, smartglasses, a home/office control system, etc.) for controlling a plurality of lighting devices 120, 122. The control device 100 comprises a display 102. The display 102 is configured to render images, which image may be used by a user as a color picker for selecting colors for the plurality of lighting devices 120, 122.

The control device 100 further comprises a user interface 104 configured to receive user input. This enables a user to select lighting devices via the user interface and control the light output of the lighting devices. The user interface 104 may, for example, be a touch-sensitive device of the display 102 (a touch screen). Alternatively, the user interface may comprise a microphone for receiving voice input indicative of a selection and/or repositioning of a group of lighting devices or individual lighting devices, a motion sensor for receiving gesture input indicative of a selection and/or repositioning of a group of lighting devices or individual lighting devices, etc.

The control device 100 further comprises a communication unit 106 configured to communicate with the plurality of lighting devices 120, 122. The communication unit 106 of the control device may be arranged for transmitting control commands to the lighting devices 120, 122 so as to control the lighting devices 120, 122. The communication unit 106 may comprise a transmitter for transmitting the lighting control command via any wired or wireless communication protocol. Various wired and wireless communication protocols may be used, for example Ethernet, DMX, DALI, USB, Bluetooth, Wi-Fi, Li-Fi, 3G, 4G or ZigBee. The communication unit 106 may be further arranged for receiving a current light setting of the lighting devices 120, 122 (for example by receiving signals/messages/data packets comprising light setting values related to the color, saturation and/or brightness of the light setting of the lighting device). These received signals/messages/data packets relate to an (active) light setting of the lighting devices 120, 122, or a signal/message/data packet may be indicative of that a certain lighting device is unable to render a certain color.

The control device 100 further comprises a processor 108 (e.g. a microchip, circuitry, a microcontroller, etc.). The processor 108 is configured to group the plurality of lighting devices 120, 122 and render a virtual representation of the group at a first location in the image. FIG. 2a illustrates an example of a virtual representation of a group comprising lighting devices A and B. The processor 108 may be further configured to determine a first color associated with one or more pixels at the first location in the image. The first location of the virtual representation is associated with first color information. The first color information may, for example, be defined by an average color value of pixels at the position of the virtual representation, an average color value of pixel values associated with the area covered by the virtual representation, a color value of a single pixel located at, for example, the center of the virtual representation, etc. The processor 108 may be further configured to control the lighting devices A and B (not shown in FIG. 2a) of the group of lighting devices according to the first color information. In this example, the first color at the location of the virtual representation of the group comprising lighting devices A and B may, for instance, be a warm white color, and the processor 108 may control lighting devices A and B according to this color.

The processor 108 is further configured to obtain light rendering information from the plurality of lighting devices 120, 122, wherein the light rendering information relates to light rendering capabilities of the respective lighting devices 120, 122. The light rendering capabilities may relate to, for example, color rendering capabilities, dimming/brightness range capabilities, etc. The processor 108 may obtain the light rendering information of the lighting devices by accessing a memory 130 (storing the lighting rendering information) comprised in the lighting control device 100, by accessing a memory 132 (e.g. a bridge, a central home/office control system, etc.) located remote from the lighting control device 100, by receiving it directly from the lighting devices 120, 122, etc.

The processor 108 is further configured to receive, via the user interface 104, a user input indicative of a repositioning of the virtual representation from the first location to a second location in the image. This is illustrated in FIGS. 2a and 2b, wherein a user provides a touch input by dragging the virtual representation of the group of lighting devices A and B to a second location (corresponding to the second virtual representation of a second subgroup comprising lighting device B).

The processor 108 is further configured to determine, based on the light rendering information of the lighting devices 120, 122, if the lighting devices 120, 122 of the group are able to render a second color associated with one or more pixels at the second location in the image. Referring to FIG. 2b, the processor may determine whether lighting devices A and B are able to render the color associated with the pixels of the image at the second location (corresponding to the second virtual representation of a second subgroup comprising lighting device B).

The processor 108 is further configured to divide the group of lighting devices 120, 122 into a first subgroup comprising at least one lighting device 120 that is unable to render the second color and a second subgroup comprising at least one lighting device 122 that is able to render the second color, and to a first virtual representation of the first subgroup and a second virtual representation of the second subgroup in the image on the display 102. This is further illustrated in FIG. 2b, wherein lighting device A is not able to render the color associated with the pixels of the image at the second location, resulting in the creation of a first subgroup (comprising lighting device A), and wherein lighting device B is able to render the color associated with the pixels of the image at the second location, resulting in the creation of a second subgroup (comprising lighting device B). After splitting/dividing the group, the first virtual representation of the first subgroup may be positioned at the original first location (in FIG. 2b at the location where group comprising A and B started), and the second virtual representation of the second subgroup may be positioned at the second first location (in FIG. 2b at the location where the user moved the virtual representation of the group comprising A and B towards). FIGS. 3a and 3b illustrate an alternative, wherein the virtual representation moves as a group while the user is repositioning its virtual representation until one of the lighting devices of the group (in this example lighting device A) can no longer render the color selected by the user, whereas the other lighting device of the group (in this example lighting device B) is able to render this color.

The processor 108 may be configured to render the first virtual representation at a third location. The third location may for example be a location in the image where the color values of the pixels in the image are close or closest to the color values of the pixels at the second location. In other words, the third location may be selected such that the color of the lighting device that is unable to render the color of the second location in the image resembles the color of the second location. If, for instance, a lighting device is unable to render a user selected green (e.g. RGB (34,139,34)), but when it is able to render a different shade of green (e.g. RGB (0.255.0)), the third location in the image may be selected based on the shade of green that can be rendered by the lighting device.

The processor 108 may be further configured to control, via the communication unit 106, the at least one lighting device of the first subgroup (lighting device A in FIGS. 2a-3b) according to the first color, and control, via the communication unit 106, the at least one lighting device of the second subgroup (lighting device B in FIGS. 2a-3b) according to the second color.

In the examples of FIGS. 2a, 2b, 3a and 3b, lighting device A may for example be a tunable white lighting device configured to render white light with different color temperatures, and lighting device B may for example be a multi-color lighting device configured to render colors of the CIE color spectrum, including whites that can be rendered by the tunable white lighting device A.

Thus, as illustrated in FIGS. 2a, 2b, 3a and 3b and in above-mentioned examples, when a user moves a virtual representation of a group comprising two different lighting devices (e.g. a tunable white lighting device and a multi-color lighting device), the group will remain a group until one of the lighting devices is no longer able to render a user-selected color.

The processor 108 may be further configured to, if no light rendering information has been received from the plurality of lighting devices 120, 122, control the group of lighting devices 120, 122 according to the second color. The processor 108 may be further configured to receive a signal from the lighting devices of the group. This signal may be indicative of that a certain lighting device 120, 122 is unable to render the second color. Subsequently, the processor 108 may perform the step of dividing the group of lighting devices 120, 122 into the first subgroup comprising at least one lighting device that is unable to render the second color and the second subgroup comprising at least one lighting device that is able to render the second color. The processor 108 may further render a first virtual representation of the first subgroup, and a second virtual representation of the second subgroup in the image on the display 102.

The processor 108 may be further configured to receive a second user input indicative of a regrouping of the first subgroup and the second subgroup. The processor 108 may be further configured to regroup the first subgroup and the second subgroup based on the user input, and render a "regroup" virtual representation in the image. The user may, for example, drag the first virtual representation of the first subgroup to the second virtual representation of the second subgroup to regroup them. The regroup virtual representation may be rendered at a predefined location in the image, for instance in the center of the image. Alternatively, the regroup virtual representation may be rendered at a current location of the first virtual representation in the image, i.e. at the location in the image of the first virtual representation of the first subgroup. Alternatively, the regroup virtual representation may be rendered at a location at which one or more pixels of the image correspond to a current light setting of the first subgroup of lighting devices, e.g. at a location in the image which comprises color values that substantially correspond to the color values of the current light setting of the lighting devices of the first subgroup.

Figure 4A:
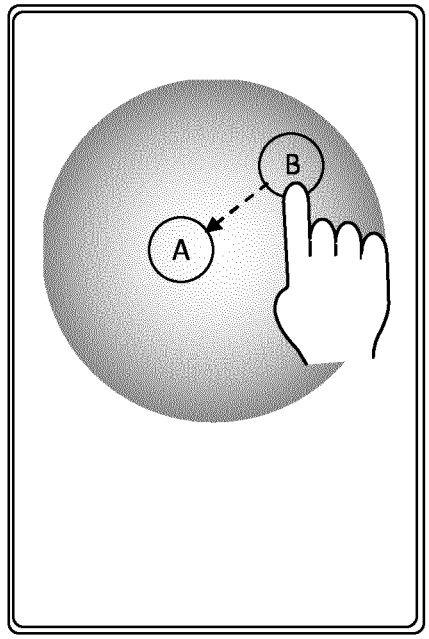
FIGS. 4a and 4b show schematically an embodiment of regrouping two lighting devices in an image, wherein the image is a color spectrum.
Figure 4B:
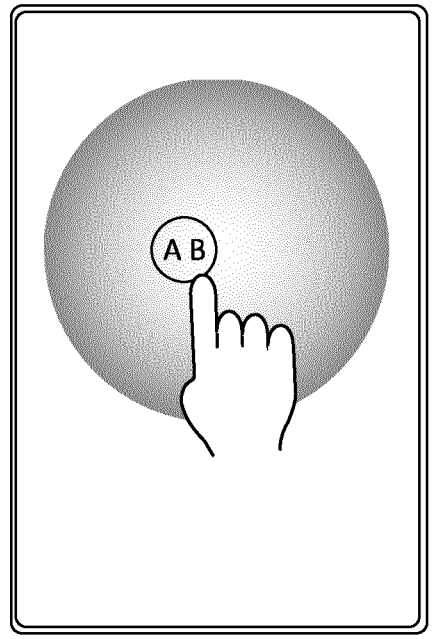
Figure 5A:
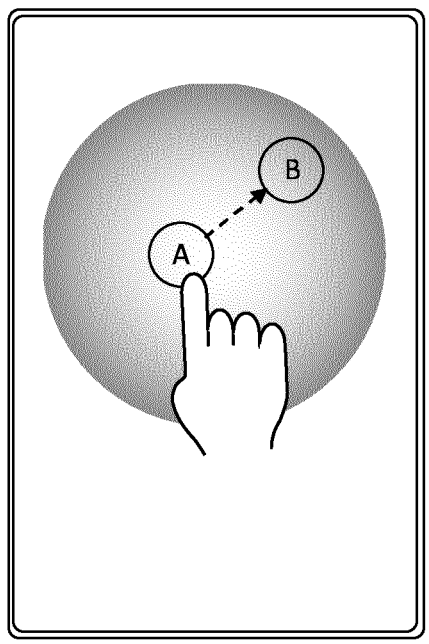
FIGS. 5a and 5b show schematically an embodiment of regrouping two lighting devices in an image, wherein the image is a color spectrum.
Figure 5B:
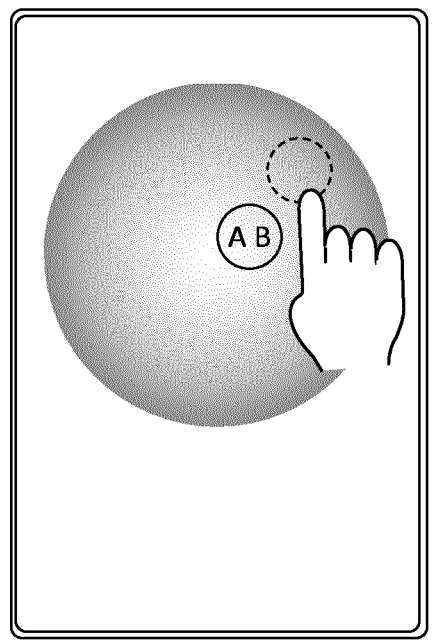

FIGS. 4a and 4b show a first example of regrouping two lighting devices A and B. A user may drag the virtual representation of lighting device B towards the virtual representation of lighting device A, whereupon the a new "regroup" virtual representation of lighting devices A and B is created (see FIG. 4b). Since lighting device B is able to render the color in the image associated with the location of the virtual representation of lighting device A, no issues occur when the lighting devices A and B are controlled according to that color. If, however, a user would drag a virtual representation of a first lighting device to a virtual representation of a second lighting device, wherein the first lighting device is unable to render a color in the image associated with the location of the virtual representation of the second lighting device, the processor 108 may position the regroup virtual representation at a location where both the first and the second lighting devices are able to render the color associated with that location. This is illustrated in FIGS. 5a and 5b, wherein a user drags a virtual representation of lighting device A to a virtual representation of lighting device B. In this example, lighting device A is unable to render the color associated with the location of the virtual representation of lighting device B. The processor may therefore position the regroup virtual representation at a location (location A B in FIG. 5b) where both lighting device A and lighting device B are able to render the color associated with that location.

The processor 108 may be further configured to replace the image with a second image. This replacement may be based on a user input. The (first) image may for example be an image of a color spectrum, and the second image may be a different color spectrum. The first image may for example be a full color spectrum (e.g. a CIE color spectrum), which may be beneficial if one or more of the lighting devices are multi-color lamps. The second image may for example be a warm-to-cool white color spectrum, which may be beneficial if one or more of the lighting devices are tunable white lamps. The processor 108 may be configured to switch between images (or color spectra) based on which group or subgroup of lighting devices is selected by a user.

Figure 6A:
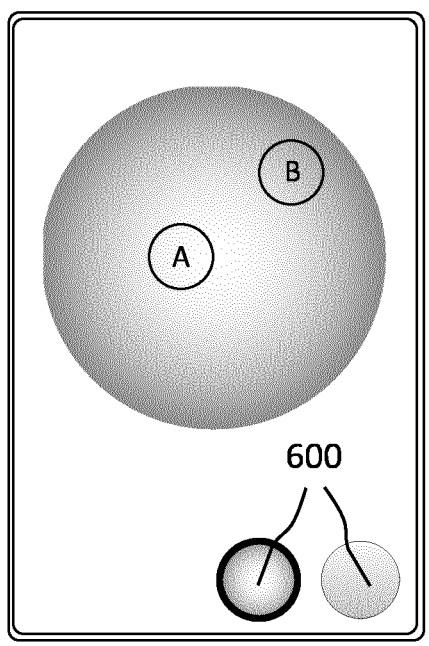
FIGS. 6a and 6b show schematically an embodiment of switching between color spectra.
Figure 6B:
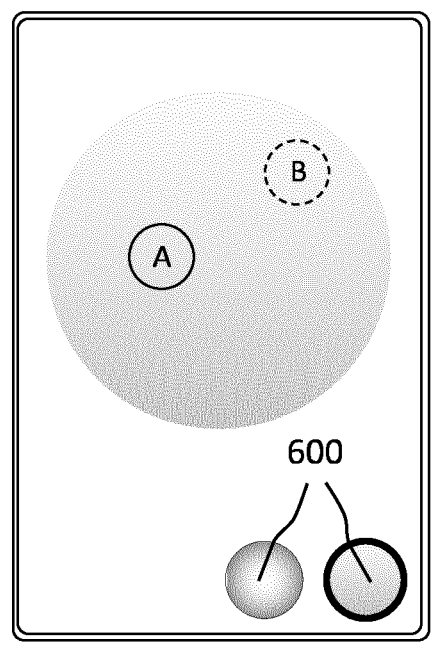

FIGS. 6a and 6b illustrate an example of switching between spectra. In this example, lighting device A may be a tunable white lighting device, and lighting device B may be a multi-color lighting device. Lighting devices A and B have been ungrouped, and lighting device B may be controlled according to a color that cannot be rendered by lighting device A. A user may select the virtual representation of lighting device A, whereupon the processor 108 may switch from the first color spectrum (e.g. a full color spectrum) in FIG. 6a to the second color spectrum (e.g. a warm-to-cool white spectrum) in FIG. 6b. Additionally or alternatively, the processor may provide a dedicated user interface element 600 on the display which enables the user to switch between the color spectra. After switching to the second color spectrum, the virtual representation of lighting device B may be adjusted (e.g. by making it partially transparent, giving it a different color, changing its icon, etc.) to indicate that the control of lighting device B is not based on its current position in the second color spectrum, but that its control is based on its current position in the first color spectrum. The user may reposition the virtual representation of lighting device A in the second color spectrum to control the light output of lighting device A. The processor 108 may be further configured to switch back to the first color spectrum upon receiving a user input, for instance via a selection of the virtual representation of lighting device B, or via the dedicated user interface element 600.

The processor 108 may be further configured to render the first virtual representation in the second image at a location of which one or more pixels are associated with the first color. After replacement of the first image by the second image, the first virtual representation of the first subgroup may be rendered at a location in the image where the color values of the image correspond to the color values of the first color/current light setting of the lighting devices of the first subgroup.

The lighting devices 120, 122 may be any type of lighting devices arranged for receiving lighting control commands. Each lighting device may be a lighting device with a single white or color point, a multi-color lighting device, a tunable white lighting device, etc. The lighting devices 120, 122 may comprise an LED light source, an incandescent light source, a fluorescent light source, a high-intensity discharge light source, etc. The lighting devices 120, 122 may be arranged for providing general lighting, task lighting, ambient lighting, atmosphere lighting, accent lighting, indoor lighting, outdoor lighting, etc. The lighting devices 120, 122 may be installed in a luminaire or in a lighting fixture, or the lighting devices 120, 122 may be standalone lighting devices such as LED strips/matrices. Alternatively, the lighting devices may be portable lighting devices (e.g. a hand-sized device, such as an LED cube, an LED sphere, etc.).

Figure 7:
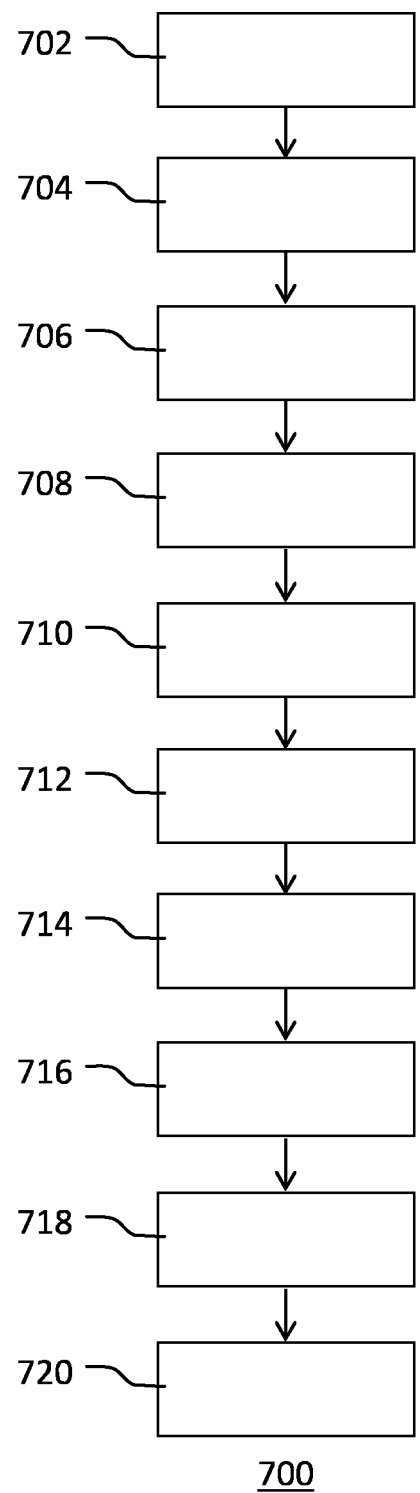
FIG. 7 shows schematically a method of controlling a plurality of lighting devices.

FIG. 7 shows schematically a method 700 of controlling a plurality of lighting devices 120, 122. The method 700 comprises:
- grouping 702 the plurality of lighting devices into a group of lighting devices,
- rendering 704 a virtual representation of the group of lighting devices at a first location in an image on a display,
- determining 706 a first color associated with one or more pixels at the first location in the image,
- obtaining 708 light rendering information from the plurality of lighting devices, wherein the light rendering information relates to light rendering capabilities of the respective lighting devices,
- receiving 710 a user input indicative of a repositioning of the virtual representation from the first location to a second location in the image,
- determining 712, based on the light rendering information, if the lighting devices of the group are able to render a second color associated with one or more pixels at the second location in the image,
- dividing 714 the group of lighting devices into a first subgroup comprising at least one lighting device that is unable to render the second color and a second subgroup comprising at least one lighting device that is able to render the second color,
- rendering 716 a first virtual representation of the first subgroup, and a second virtual representation of the second subgroup in the image on the display,
- controlling 718 the at least one lighting device of the first subgroup according to the first color, and
- controlling 720 the at least one lighting device of the second subgroup according to the second color.

The method 700 may be executed by computer program code of a computer program product when the computer program product is run on a processing unit of a computing device, such as the processor 108 of the lighting control device 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a plurality of lighting devices, the method comprising:
   - grouping the plurality of lighting devices into a group of lighting devices,
   - rendering a virtual representation of the group of lighting devices at a first location in an image on a display,
   - determining a first color associated with one or more pixels at the first location in the image,
   - obtaining light rendering information from the plurality of lighting devices, wherein the light rendering information relates to light rendering capabilities of the respective lighting devices,
   - receiving a user input indicative of a repositioning of the virtual representation from the first location to a second location in the image,
   - determining, based on the light rendering information, if the lighting devices of the group are able to render a second color associated with one or more pixels at the second location in the image,
   - dividing the group of lighting devices into a first subgroup comprising at least one lighting device that is unable to render the second color and a second subgroup comprising at least one lighting device that is able to render the second color,
   - rendering a first virtual representation of the first subgroup at the first location, and a second virtual representation of the second subgroup at the second location in the image on the display,
   - controlling the at least one lighting device of the first subgroup according to the first color, and
   - controlling the at least one lighting device of the second subgroup according to the second color.

2. The method of claim 1, further comprising:
   - receiving a second user input indicative of a regrouping of the first subgroup and the second subgroup,
   - rendering a regroup virtual representation in the image, wherein the regroup virtual representation has a location in the image that corresponds to:
     - a predefined location in the image,
     - a current location of the first virtual representation in the image, or
     - a location at which one or more pixels of the image correspond to a current light setting of the first subgroup of lighting devices.

3. The method of claim 1, wherein the image is a color spectrum.

4. The method of claim 3, wherein the image is a first color spectrum, and wherein the at least one lighting device of the first subgroup is configured to render a part of the colors of the first color spectrum, and wherein the method further comprises:

obtaining a second image comprising a second color spectrum, wherein the at least one lighting device of the first subgroup is configured to render the colors of the second color spectrum, receiving a third user input, replacing the first image with the second image on the display upon receiving the third user input.

5. The method of claim 4, further comprising the step of:

rendering the first virtual representation in the second image at a location of which one or more pixels are associated with the first color.

6. The method of claim 4, wherein the third user input is indicative of a selection of the first virtual representation.

7. The method of claim 1, wherein the user input is a touch input on a touch-sensitive device of the display.

8. The method of claim 1, wherein the user input comprises dragging the virtual representation across the image on the display.

9. The method of claim 1, wherein the group of lighting devices comprises:

at least one tunable white lighting device, and at least one multi-color lighting device.

10. The method of claim 1, wherein the method comprises, after the step of determining the first color associated with one or more pixels at the first location in the image, controlling the lighting devices of the group of lighting devices according to the first color.

11. A non-transitory computer-readable storage device with computer-executable instructions stored thereon that, when executed by one or more computer processors, cause the one or more computer processors to perform the method of claim 1.

12. A lighting control device for controlling a plurality of lighting devices, the lighting control device comprising:

a display, a user interface configured to receive a user input, a communication unit configured to communicate with the plurality of lighting devices, a processor configured to:

group the plurality of lighting devices into a group of lighting devices, render a virtual representation of the group of lighting devices at a first location in an image on the display, determine a first color associated with one or more pixels at the first location in the image, obtain light rendering information from the plurality of lighting devices, wherein the light rendering information relates to light rendering capabilities of the respective lighting devices, receive, via the user interface, a user input indicative of a repositioning of the virtual representation from the first location to a second location in the image, determine, based on the light rendering information, if the lighting devices of the group are able to render a second color associated with one or more pixels at the second location in the image, divide the group of lighting devices into a first subgroup comprising at least one lighting device that is unable to render the second color and a second subgroup comprising at least one lighting device that is able to render the second color, render a first virtual representation of the first subgroup at the first location in the image, and a second virtual representation of the second subgroup at the second location in the image on the display, control, via the communication unit, the at least one lighting device of the first subgroup according to the first color, and control, via the communication unit, the at least one lighting device of the second subgroup according to the second color.

13. A lighting system for controlling a plurality of lighting devices, comprising:

the lighting control device of claim 12, and a plurality of lighting devices configured to receive control commands from the lighting control device.

* * * * *